(12) United States Patent
Hwang et al.

(10) Patent No.: US 9,897,174 B2
(45) Date of Patent: Feb. 20, 2018

(54) PLANETARY GEAR TRAIN OF AUTOMATIC TRANSMISSION FOR VEHICLES

(71) Applicant: Hyundai Motor Company, Seoul (KR)

(72) Inventors: Seong Wook Hwang, Whasung-Si (KR); Hyun Sik Kwon, Whasung-Si (KR); Wonmin Cho, Whasung-Si (KR); Jae Chang Kook, Whasung-Si (KR); Seongwook Ji, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/266,061

(22) Filed: Sep. 15, 2016

(65) Prior Publication Data
US 2017/0284513 A1    Oct. 5, 2017

(30) Foreign Application Priority Data

Mar. 30, 2016 (KR) .......................... 10-2016-0038480

(51) Int. Cl.
| | | |
|---|---|---|
| *F16H 3/62* | (2006.01) | |
| *F16H 3/44* | (2006.01) | |
| *F16H 37/06* | (2006.01) | |
| *F16H 3/66* | (2006.01) | |

(52) U.S. Cl.
CPC ........ *F16H 3/66* (2013.01); *F16H 2200/0073* (2013.01); *F16H 2200/2012* (2013.01); *F16H 2200/2048* (2013.01)

(58) Field of Classification Search
CPC ................. F16H 2200/2012; F16H 2200/2048
See application file for complete search history.

(56) References Cited

U.S. PATENT DOCUMENTS

| | | | | |
|---|---|---|---|---|
| 8,636,617 | B2 * | 1/2014 | Singh ........................ | F16H 3/66 475/275 |
| 9,599,197 | B1 * | 3/2017 | Park ......................... | F16H 3/66 |
| 2008/0009385 | A1 * | 1/2008 | Kamm .................... | F16H 3/666 475/296 |
| 2008/0269005 | A1 * | 10/2008 | Phillips ..................... | F16H 3/66 475/276 |
| 2010/0216588 | A1 * | 8/2010 | Wittkopp .................. | F16H 3/66 475/275 |
| 2010/0216590 | A1 * | 8/2010 | Phillips ................... | F16H 3/666 475/275 |

FOREIGN PATENT DOCUMENTS

KR    10-2014-0046240 A    5/2014

* cited by examiner

*Primary Examiner* — Tisha Lewis
(74) *Attorney, Agent, or Firm* — Morgan, Lewis & Bockius LLP

(57) ABSTRACT

A planetary gear train of claim of an automatic transmission for a vehicle may include an input shaft for receiving an engine torque, an output shaft for outputting a shifted torque, a first planetary gear set, a second planetary gear set, a third planetary gear set, a fourth planetary gear set, a first shaft, a second shaft, a third shaft, a fourth shaft directly connected with a transmission housing, a fifth shaft selectively connectable with the second shaft, a sixth shaft directly connected with the output shaft, a seventh shaft, an eighth shaft selectively connectable with the first shaft and the second shaft, and directly connected with the input shaft, and a ninth shaft selectively connectable with the sixth shaft.

9 Claims, 2 Drawing Sheets

FIG. 2

| Shift-stage | Control element | | | | | | | Gear ratio |
|---|---|---|---|---|---|---|---|---|
| | C1 | C2 | C3 | C4 | B1 | B2 | B3 | |
| D1 |  | ● | ● |  |  | ● |  | 6.273 |
| D2 | ● | ● |  |  |  | ● |  | 4.000 |
| D3 | ● |  | ● |  |  | ● |  | 3.091 |
| D4 | ● |  |  |  |  | ● | ● | 2.208 |
| D5 |  |  |  | ● |  | ● | ● | 1.698 |
| D6 | ● |  |  | ● |  |  | ● | 1.326 |
| D7 | ● |  | ● | ● |  |  |  | 1.098 |
| D8 | ● | ● |  | ● |  |  |  | 1.000 |
| D9 |  | ● | ● | ● |  |  |  | 0.901 |
| D10 |  | ● |  | ● | ● |  |  | 0.767 |
| D11 |  |  | ● | ● | ● |  |  | 0.685 |
| REV |  |  | ● |  | ● | ● |  | 7.727 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2016-0038480, filed Mar. 30, 2016, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that improves power delivery performance and reduces fuel consumption by achieving eleven forward speed stages using a minimum number of constituent elements.

Description of Related Art

Research on realizing more shift-stages of an automatic transmission has been undertaken to achieve enhancement of fuel consumption and better drivability, and recent increases in oil prices are triggering stiff competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

However, in the automatic transmission, as the number of speed stages increase, the number of parts is typically increased, which may deteriorate installability and/or power flow efficiency and may increase production cost, and weight.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements has been attempted. However, such an arrangement may is not widely applicable, and using dog clutches may easily deteriorate shift-feel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of obtaining shift-stages of at least eleven forward speeds and at least one reverse speed by minimal number of parts, improving power delivery performance and fuel consumption by multi-stages of an automatic transmission, and improving driving stability of a vehicle by utilizing a low rotation speed of an engine.

According to various aspects of the present invention, a planetary gear train of an automatic transmission for a vehicle may include an input shaft for receiving an engine torque, an output shaft for outputting a shifted torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first shaft connected with the first rotation element, a second shaft connected with the second rotation element, a third shaft interconnecting the third rotation element and the fifth rotation element, a fourth shaft connected with the fourth rotation element, and directly connected with a transmission housing, a fifth shaft interconnecting the sixth rotation element, the seventh rotation element and tenth rotation element, and selectively connectable with the second shaft, a sixth shaft connected with the eighth rotation element, and directly connected with the output shaft, a seventh shaft connected with the ninth rotation element, an eighth shaft connected with the eleventh rotation element, selectively connectable with the first shaft and the second shaft, and directly connected with the input shaft, and a ninth shaft connected with the twelfth rotation element, and selectively connectable with the sixth shaft.

The first shaft, the second shaft and the seventh shaft may each be selectively connectable with the transmission housing.

The first, second, and third rotation elements may be a first sun gear, a first planet carrier, and a first ring gear, the fourth, fifth, and sixth rotation elements may be a second sun gear, a second planet carrier, and a second ring gear, the seventh, eighth, and ninth rotation elements may be a third sun gear, a third planet carrier, and a third ring gear, and the tenth, eleventh, and twelfth rotation elements may be a fourth sun gear, a fourth planet carrier, and a fourth ring gear.

The planetary gear train may further include a first clutch selectively connecting the second shaft and the eighth shaft, a second clutch selectively connecting the second shaft and the fifth shaft, a third clutch selectively connecting the first shaft and the eighth shaft, a fourth clutch selectively connecting the sixth shaft and the ninth shaft, a first brake selectively connecting the second shaft and the transmission housing, a second brake selectively connecting the seventh shaft and the transmission housing, and a third brake selectively connecting the first shaft and the transmission housing.

According to various aspects of the present invention, a planetary gear train of an automatic transmission for a vehicle may include an input shaft for receiving an engine torque, an output shaft for outputting a shifted torque, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be directly connected with the eleventh rotation element, the output shaft may be directly connected with the eighth rotation element, the third rotation element may be directly connected with the fifth rotation element, the sixth rotation element may be selectively connectable with the second rotation element, the seventh rotation element and the tenth rotation element directly may be connected with the sixth rotation element, the eighth rotation element may be selectively connectable with the first rotation element and the second rotation element, and the twelfth rotation element may be selectively connectable with the eighth rotation element.

The first rotation element and the second rotation element and the ninth rotation element may each be selectively connectable with the transmission housing.

The planetary gear train may further include a first clutch selectively connecting the second rotation element and the eleventh rotation element, a second clutch selectively connecting the second rotation element and the sixth rotation element, a third clutch selectively connecting the first rotation element and the eleventh rotation element, a fourth clutch selectively connecting the eighth rotation element and the twelfth rotation element, a first brake selectively connecting the second rotation element and the transmission housing, a second brake selectively connecting the ninth rotation element and the transmission housing, and a third brake selectively connecting the first rotation element and the transmission housing.

Speed shift-stages implemented by selectively operating the first, second, third and fourth clutches and the first, second and third brakes may include a forward first speed shift-stage, implemented by operating the second and third clutches, and the second brake, a forward second speed shift-stage, implemented by operating the first and second clutches, and the second brake, a forward third speed shift-stage, implemented by operating the first and third clutches, and the second brake, a forward fourth speed shift-stage, implemented by operating the first clutch, and the second and third brakes, a forward fifth speed shift-stage, implemented by operating the fourth clutch, and the second and third brakes, a forward sixth speed shift-stage, implemented by operating the first and fourth clutches and the third brake, a forward seventh speed shift-stage, implemented by operating the first, third and fourth clutches, a forward eighth speed shift-stage, implemented by operating the first, second and fourth clutches, a forward ninth speed shift-stage, implemented by operating the second, third and fourth clutches, a forward tenth speed shift-stage, implemented by operating the second and fourth clutches, and the first brake, a forward eleventh speed shift-stage, implemented by operating the third and fourth clutches, and the first brake, and a reverse-speed shift-stage, implemented by operating the third clutch, and the first and second brakes.

According to various embodiments of the present invention, shift-stages of at least eleventh forward speeds and at least one reverse speed are realized by combination of four planetary gear sets and seven control elements.

In addition, a planetary gear train according to various embodiments of the present invention substantially improves driving stability by realizing shift-stages appropriate for rotation speed of an engine due to multiple speed-stages of an automatic transmission.

Furthermore, a planetary gear train according to various embodiments of the present invention maximizes engine driving efficiency by multiple speed-stages of an automatic transmission, and improves power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in the planetary gear train according to various embodiments of the present invention.

Figure 1:
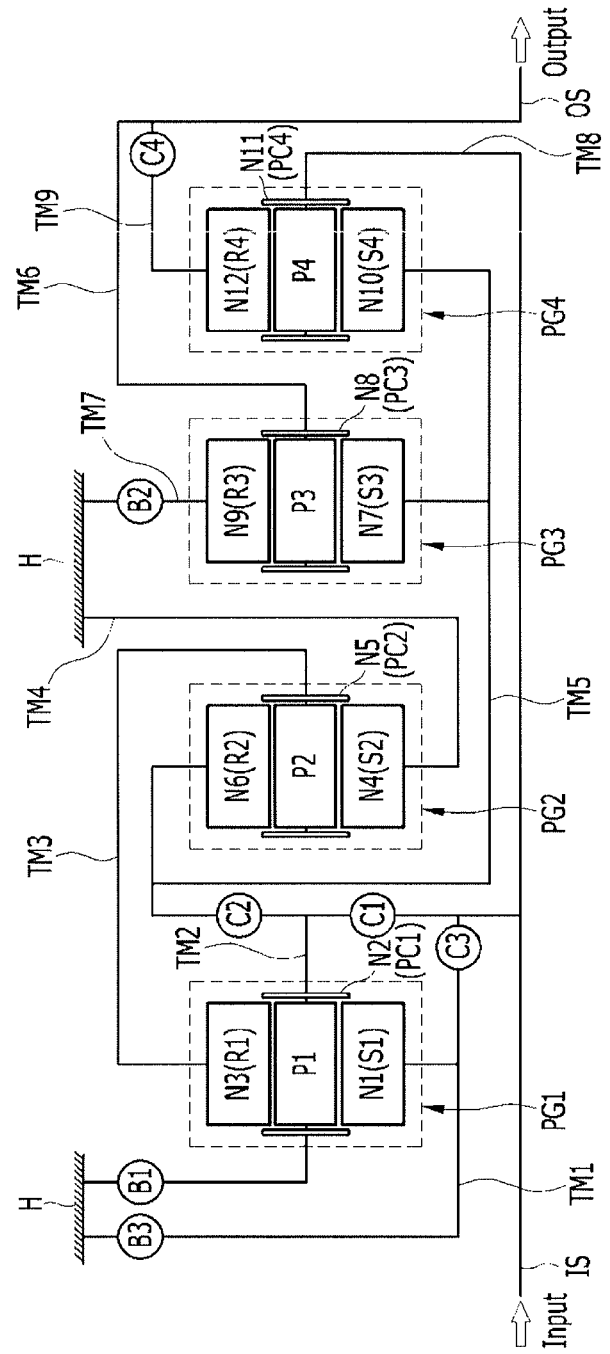
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear set PG1, PG2, PG3, and PG4, arranged on a same axis, an input shaft IS, an output shaft OS, eight shafts TM1 to TM8 interconnecting rotation elements of the first, second, third, and fourth planetary gear set PG1, PG2, PG3, and PG4, four clutches C1 to C4 and three brakes B1 to B3 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus.

The first planetary gear set PG1 is a single pinion planetary gear set, and includes a first planet carrier PC1 that supports first pinion gear P1 externally engaged with the first sun gear S1, and a first ring gear R1 that is internally engaged with the first pinion gear P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second planet carrier PC2 that supports second pinion gear P2 externally engaged with the second sun gear S2, and a second ring gear R2 that is internally engaged with the second pinion gear P2. The second sun gear S2 acts as a fourth rotation element N4, the second planet carrier PC2 acts as a fifth rotation element N4, and the second ring gear R2 acts as a sixth rotation element N6.

The third planetary gear set PG3 is a single pinion planetary gear set, and includes a third planet carrier PC3 that supports third pinion gear P3 externally engaged with the third sun gear S3, and a third ring gear R3 that is internally engaged with the third pinion gear P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth planet carrier PC4 that supports fourth pinion gear P4 externally engaged with the fourth sun gear S4, and a fourth ring gear R4 that is internally engaged with the fourth pinion gear P4. The fourth sun gear S4 acts as a tenth rotation element N10, the fourth planet carrier PC4 acts as a eleventh rotation element N11, and the fourth ring gear R4 acts as a twelfth rotation element N12.

In the first, second, third, and fourth planetary gear set PG1, PG2, PG3, and PG4, the second rotation element N2 is directly connected with the fourth rotation element N4 and the eighth rotation element N8, the fifth rotation element N5 is directly connected with the twelfth rotation element N12, and the seventh rotation element N7 is directly connected with the tenth rotation element N10, by nine shafts TM1 to TM9.

The nine shafts TM1 to TM9 are hereinafter described in detail.

Each of the nine shafts TM1 to TM9 may be a rotation member that directly interconnects the input and output shafts and rotation elements of the planetary gear sets PG1, PG2, PG3, and PG4, or may be a fixed member fixed to the transmission housing H.

The first shaft TM1 is connected with the first rotation element N1 (the first sun gear S1), and is selectively connectable with the transmission housing H.

The second shaft TM2 is connected with the second rotation element N2 (the first planet carrier PC1), and is selectively connectable with the transmission housing H.

The Third shaft TM3 connects the third rotation element N3 (the first ring gear R1) and the fifth rotation element N5 (the second planet carrier PC2).

The fourth shaft TM4 is connected with the fourth rotation element N4 (the second sun gear S2), and is directly connected with the transmission housing H.

The fifth shaft TM5 connects the sixth rotation element N6 (the second ring gear R2), the seventh rotation element N7 (the third sun gear S3), and the tenth rotation element N10 (the fourth sun gear S4), and is selectively connectable with the second shaft TM2.

The sixth shaft TM6 is connected with the eighth rotation element N8 (the third planet carrier PC3), and is directly connected with the output shaft OS, thereby continuously acting as an output element.

The seventh shaft TM7 is connected with the ninth rotation element N9 (the third ring gear R3), and selectively connectable with the transmission housing H.

The eighth shaft TM8 is connected with the eleventh rotation element N11 (the fourth planet carrier PC4), is selectively connectable with the first shaft TM1 and the second shaft TM2, and is directly connected with the input shaft IS, thereby continuously acting as an input element.

The ninth shaft TM9 is connected with the twelfth rotation element N12 (the fourth ring gear R4), and is selectively connectable with the sixth shaft TM6.

The nine shafts TM1 to TM9, the input shaft IS, and the output shaft OS may be selectively interconnected with one another by control elements of four clutches C1, C2, C3, and C4.

The nine shafts TM1 to TM9 may be selectively connectable with the transmission housing H, by control elements of three brakes B1, B2 and B3.

The four clutches C1 to C4 and the three brakes B1 to B3 are arranged as follows.

The first clutch C1 is arranged between the second shaft TM2 and the eighth shaft TM8, and selectively connects the second shaft TM2 and the eighth shaft TM8 connected with the output shaft OS thereby controlling power delivery therebetween.

The second clutch C2 is arranged between the second shaft TM2 and the fifth shaft TM5, and selectively connects the second shaft TM2 and the fifth shaft TM5 connected with the output shaft OS thereby controlling power delivery therebetween.

The third clutch C3 is arranged between the first shaft TM1 and the eighth shaft TM8, and selectively connects the first shaft TM1 and the eighth shaft TM8 connected with the output shaft OS thereby controlling power delivery therebetween.

The fourth clutch C4 is arranged between the sixth shaft TM6 and the ninth shaft TM9, and selectively connects the sixth shaft TM6 and the ninth shaft TM9 connected with the output shaft OS thereby controlling power delivery therebetween.

The first brake B1 is arranged between the second shaft TM2 and the transmission housing H, and selectively connects the second shaft TM2 to the transmission housing H.

The second brake B2 is arranged between the seventh shaft TM7 and the transmission housing H, and selectively connects the seventh shaft TM7 to the transmission housing H.

The third brake B3 is arranged between the first shaft TM1 and the transmission housing H, and selectively connects the first shaft TM1 to the transmission housing H.

The respective control elements of the first, second, third, and fourth clutches C1, C2, C3, and C4 and the first, second, and third brakes B1, B2, and B3 may be realized as multi-plate hydraulic pressure friction devices that are frictionally engaged by hydraulic pressure.

FIG. 2 is an operational chart for respective control elements at respective shift-stages in a planetary gear train according to various embodiments of the present invention.

Referring to FIG. 2, a planetary gear train according to various embodiments of the present invention realizes eleven forward speeds and one reverse speed by operating three control elements among the first, second, third, and fourth clutches C1, C2, C3, and C4 and the first, second, and third brakes B1, B2, and B3 at respective shift-stages.

In the forward first speed shift-stage D1, the second and third clutches C2 and C3 and the second brake B2 are operated.

As a result, the second shaft TM2 is connected with the fifth shaft TM5 by the operation of the second clutch C2, and the first shaft TM1 is connected with the eighth shaft TM8 by the operation of the third clutch C3. In this state, the torque of the input shaft IS is input to the first shaft TM1 and the eighth shaft TM8.

In addition, the fourth connecting member TM4 continuously acts as a fixed element and the seventh shaft TM7 simultaneously acts as a fixed element by the operation of the second brake B2, thereby realizing the forward first speed by cooperative operation of respective connecting members and outputting a shifted torque through the output shaft OS connected with the sixth shaft TM6.

In the forward second speed shift-stage D2, the first and second clutches C1 and C2 and the second brake B2 are operated.

As a result, the second shaft TM2 is connected with the eighth shaft TM8 by the operation of the first clutch C1, and the second shaft TM2 is connected with the fifth shaft TM5 by the operation of the second clutch C2. In this state, the torque of the input shaft IS is input to the second shaft TM2, the fifth shaft TM5, and the eighth shaft TM8.

In addition, the fourth connecting member TM4 continuously acts as a fixed element and the seventh shaft TM7 simultaneously acts as a fixed element by the operation of the second brake B2, thereby realizing the forward second speed by cooperative operation of respective connecting members and outputting a shifted torque through the output shaft OS connected with the sixth shaft TM6.

In the forward third speed shift-stage D3, the first and third clutches C1 and C3 and the second brake B2 are operated.

As a result, the second shaft TM2 is connected with the eighth shaft TM8 by the operation of the first clutch C1, and the first shaft TM1 is connected with the eighth shaft TM8 by the operation of the third clutch C3. In this state, the torque of the input shaft IS is input to the second shaft TM2 and the eighth shaft TM8.

In addition, the fourth connecting member TM4 continuously acts as a fixed element and the seventh shaft TM7 simultaneously acts as a fixed element by the operation of the second brake B2, thereby realizing the forward third speed by cooperative operation of respective connecting members and outputting a shifted torque through the output shaft OS connected with the sixth shaft TM6.

In the forward fourth speed shift-stage D4, the first clutch C1 and the second and third brakes B2 and B3 are operated.

As a result, the second shaft TM2 is connected with the eighth shaft TM8 by the operation of the first clutch C1. In this state, the torque of the input shaft IS is input to the second shaft TM2 and the eighth shaft TM8.

In addition, the fourth connecting member TM4 continuously acts as a fixed element and the first shaft TM1 and the seventh shaft TM7 simultaneously act as fixed elements by the operation of the second and third brakes B2 and B3, thereby realizing the forward fourth speed by cooperative operation of respective connecting members and outputting a shifted torque through the output shaft OS connected with the sixth shaft TM6.

In the forward fifth speed shift-stage D5, the fourth clutch C4 and the second and third brakes B2 and B3 are operated.

As a result, the sixth shaft TM6 is connected with the ninth shaft TM9 by the operation of the fourth clutch C4. In this state, the torque of the input shaft IS is input to the second shaft TM2 and the eighth shaft TM8.

In addition, the fourth connecting member TM4 continuously acts as a fixed element and the first shaft TM1 and the seventh shaft TM7 simultaneously act as fixed elements by the operation of the second and third brakes B2 and B3, thereby realizing the outputting a shifted torque through the output shaft OS connected with the sixth shaft TM6.

In the forward sixth speed shift-stage D6, the first and fourth clutches C1 and C4 and the third brake B3 are operated.

As a result, the second shaft TM2 is connected with the eighth shaft TM8 by the operation of the first clutch C1, and the sixth shaft TM6 is connected with the ninth shaft TM9 by the operation of the fourth clutch C4. In this state, the torque of the input shaft IS is input to the second shaft TM2 and the eighth shaft TM8.

In addition, the fourth connecting member TM4 continuously acts as a fixed element and the first shaft TM1 simultaneously acts as a fixed element by the operation of the third brake B3, thereby realizing the forward sixth speed by cooperative operation of respective connecting members and outputting a shifted torque through the output shaft OS connected with the sixth shaft TM6.

In the forward seventh speed shift-stage D7, the first, third, and fourth clutches C1, C3, and C4 are operated.

As a result, the second shaft TM2 is connected with the eighth shaft TM8 by the operation of the first clutch C1, the first shaft TM1 is connected with the eighth shaft TM8 by the operation of the third clutch C3, and the sixth shaft TM6 is connected with the ninth shaft TM9 by the operation of the fourth clutch C4. In this state, the torque of the input shaft IS is input to the first shaft TM1, the second shaft TM2, and the eighth shaft TM8.

In addition, the fourth connecting member TM4 continuously acts as a fixed element, thereby realizing the forward seventh speed by cooperative operation of respective connecting members and outputting a shifted torque through the output shaft OS connected with the sixth shaft TM6.

In the forward eighth speed shift-stage D8, the first, second, and fourth clutches C1, C2, and C4 are operated.

As a result, the second shaft TM2 is connected with the eighth shaft TM8 by the operation of the first clutch C1, the second shaft TM2 is connected with the fifth shaft TM5 by the operation of the second clutch C2, and the sixth shaft TM6 is connected with the ninth shaft TM9 by the operation of the fourth clutch C4. In this state, the torque of the input shaft IS is input to the first shaft TM1, the fifth shaft TM5, and the eighth shaft TM8.

In addition, the fourth connecting member TM4 continuously acts as a fixed element, thereby realizing the forward eighth speed by cooperative operation of respective connecting members and outputting a shifted torque through the output shaft OS connected with the sixth shaft TM6.

In the forward ninth speed shift-stage D9, the second, third, and fourth clutches C2, C3, and C4 are operated.

As a result, the second shaft TM2 is connected with the fifth shaft TM5 by the operation of the second clutch C2, the first shaft TM1 is connected with the eighth shaft TM8 by the operation of the third clutch C3, and the sixth shaft TM6 is connected with the ninth shaft TM9 by the operation of the fourth clutch C4. In this state, the torque of the input shaft IS is input to the first shaft TM1 and the eighth shaft TM8.

In addition, the fourth connecting member TM4 continuously acts as a fixed element, thereby realizing the forward ninth speed by cooperative operation of respective connecting members and outputting a shifted torque through the output shaft OS connected with the sixth shaft TM6.

In the forward tenth speed shift-stage D10, the second and fourth clutches C2 and C4 and the first brake B1 are operated.

As a result, the second shaft TM2 is connected with the fifth shaft TM5 by the operation of the second clutch C2, and the sixth shaft TM6 is connected with the ninth shaft TM9 by the operation of the fourth clutch C4. In this state, the torque of the input shaft IS is input to the eighth shaft TM8.

In addition, the fourth connecting member TM4 continuously acts as a fixed element and the second shaft TM2 simultaneously acts as a fixed element by the operation of the first brake B1, thereby realizing the forward tenth speed by cooperative operation of respective connecting members and outputting a shifted torque through the output shaft OS connected with the sixth shaft TM6.

In the forward eleventh speed shift-stage D11, the third and fourth clutches C3 and C4 and the first brake B1 are operated.

As a result, the first shaft TM1 is connected with the eighth shaft TM8 by the operation of the third clutch C3, and the sixth shaft TM6 is connected with the ninth shaft TM9 by the operation of the fourth clutch C4. In this state, the torque of the input shaft IS is input to the first shaft TM1 and the eighth shaft TM8.

In addition, the fourth connecting member TM4 continuously acts as a fixed element and the second shaft TM2 simultaneously acts as a fixed element by the operation of the first brake B1, thereby realizing the forward eleventh speed by cooperative operation of respective connecting members and outputting a shifted torque through the output shaft OS connected with the sixth shaft TM6.

In the reverse speed REV, the third clutch C3 and the first and second brake B1 and B2 are operated.

As a result, the first shaft TM1 is connected with the eighth shaft TM8 by the operation of the third clutch C3. In this state, the torque of the input shaft IS is input to the first shaft TM1 and the eighth shaft TM8.

In addition, the fourth connecting member TM4 continuously acts as a fixed element and the second shaft TM2 and the seventh shaft TM7 simultaneously act as fixed elements by the operation of the first and second brakes B1 and B2, thereby realizing the reverse speed by cooperative operation of respective connecting members and outputting a shifted torque through the output shaft OS connected with the sixth shaft TM6.

As described above, a planetary gear train according to various embodiments of the present invention realizes at least eleven forward speeds and at least one reverse speed by operating four planetary gear sets PG1, PG2, PG3, and PG4 by controlling the four clutches C1, C2, C3, and C4 and the three brakes B1, B2, and B3.

In addition, a planetary gear train according to various embodiments of the present invention realizes shift stages appropriate for rotation speed of an engine due to multiple speed-stages of an automatic transmission and improves driving stability of a vehicle by utilizing a low rotation speed of an engine.

Furthermore, a planetary gear train according to various embodiments of the present invention maximizes engine driving efficiency by multiple speed-stages of an automatic transmission, and improves power delivery performance and fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of claim of an automatic transmission for a vehicle, comprising:
    an input shaft for receiving an engine torque;
    an output shaft for outputting a shifted torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft connected with the first rotation element;
    a second shaft connected with the second rotation element;
    a third shaft interconnecting the third rotation element and the fifth rotation element;
    a fourth shaft connected with the fourth rotation element, and directly connected with a transmission housing;
    a fifth shaft interconnecting the sixth rotation element, the seventh rotation element and tenth rotation element, and selectively connectable with the second shaft;
    a sixth shaft connected with the eighth rotation element, and directly connected with the output shaft;
    a seventh shaft connected with the ninth rotation element;
    an eighth shaft connected with the eleventh rotation element, selectively connectable with the first shaft and the second shaft, and directly connected with the input shaft; and
    a ninth shaft connected with the twelfth rotation element, and selectively connectable with the sixth shaft.

2. The planetary gear train of claim 1, wherein the first shaft, the second shaft and the seventh shaft are each selectively connectable with the transmission housing.

3. The planetary gear train of claim 1, wherein
    the first rotation element, the second rotation element, and the third rotation element comprise a first sun gear, a first planet carrier, and a first ring gear;
    the fourth rotation element, the fifth rotation element, and the sixth rotation element comprise a second sun gear, a second planet carrier, and a second ring gear;
    the seventh rotation element, the eighth rotation element, and the ninth rotation element comprise a third sun gear, a third planet carrier, and a third ring gear; and
    the tenth rotation element, the eleventh rotation element, and the twelfth rotation element comprise a fourth sun gear, a fourth planet carrier, and a fourth ring gear.

4. The planetary gear train of claim 2, further comprising:
a first clutch selectively connecting the second shaft and the eighth shaft;
a second clutch selectively connecting the second shaft and the fifth shaft;
a third clutch selectively connecting the first shaft and the eighth shaft;
a fourth clutch selectively connecting the sixth shaft and the ninth shaft;
a first brake selectively connecting the second shaft and the transmission housing;
a second brake selectively connecting the seventh shaft and the transmission housing; and
a third brake selectively connecting the first shaft and the transmission housing.

5. A planetary gear train of claim of an automatic transmission for a vehicle, comprising:
an input shaft for receiving an engine torque;
an output shaft for outputting a shifted torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element; and
a fourth planetary gear set including a tenth rotation element, an eleventh rotation element, and a twelfth rotation element,
wherein the input shaft is directly connected with the eleventh rotation element,
the output shaft is directly connected with the eighth rotation element,
the third rotation element is directly connected with the fifth rotation element,
the sixth rotation element is selectively connectable with the second rotation element,
the seventh rotation element and the tenth rotation element are directly connected with the sixth rotation element,
the eleventh rotation element is selectively connectable with the first rotation element and the second rotation element, and
the twelfth rotation element is selectively connectable with the eighth rotation element.

6. The planetary gear train of claim 5, wherein the first rotation element and the second rotation element and the ninth rotation element are each selectively connectable with the transmission housing.

7. The planetary gear train of claim 5, wherein
the first rotation element, the second rotation element, and the third rotation element comprise a first sun gear, a first planet carrier, and a first ring gear;
the fourth rotation element, the fifth rotation element, and the sixth rotation element comprise a second sun gear, a second planet carrier, and a second ring gear;
the seventh rotation element, the eighth rotation element, and the ninth rotation element comprise a third sun gear, a third planet carrier, and a third ring gear; and
the tenth rotation element, the eleventh rotation element, and the twelfth rotation element comprise a fourth sun gear, a fourth planet carrier, and a fourth ring gear.

8. The planetary gear train of claim 6, further comprising:
a first clutch selectively connecting the second rotation element and the eleventh rotation element;
a second clutch selectively connecting the second rotation element and the sixth rotation element;
a third clutch selectively connecting the first rotation element and the eleventh rotation element;
a fourth clutch selectively connecting the eighth rotation element and the twelfth rotation element;
a first brake selectively connecting the second rotation element and the transmission housing;
a second brake selectively connecting the ninth rotation element and the transmission housing; and
a third brake selectively connecting the first rotation element and the transmission housing.

9. The planetary gear train of claim 8, wherein speed shift-stages implemented by selectively operating the first, second, third and fourth clutches and the first, second and third brakes include:
a first forward speed shift-stage, implemented by operating the second and third clutches, and the second brake;
a second forward speed shift-stage, implemented by operating the first and second clutches, and the second brake;
a third forward speed shift-stage, implemented by operating the first and third clutches, and the second brake;
a fourth forward speed shift-stage, implemented by operating the first clutch, and the second and third brakes;
a fifth forward speed shift-stage, implemented by operating the fourth clutch, and the second and third brakes;
a sixth forward speed shift-stage, implemented by operating the first and fourth clutches and the third brake;
a seventh forward speed shift-stage, implemented by operating the first, third and fourth clutches;
an eighth forward speed shift-stage, implemented by operating the first, second and fourth clutches;
a ninth forward speed shift-stage, implemented by operating the second, third and fourth clutches;
a forward tenth speed shift-stage, implemented by operating the second and fourth clutches, and the first brake;
a forward eleventh speed shift-stage, implemented by operating the third and fourth clutches, and the first brake; and
a reverse-speed shift-stage, implemented by operating the third clutch, and the first and second brakes.

* * * * *